Feb. 9, 1965

R. C. KVAVLE 3,168,744

EXPLOSIVELY-ACTUATED STUD-DRIVING TOOL

Filed Feb. 1, 1963

INVENTOR.
ROBERT C. KVAVLE

BY

ATTORNEY

Feb. 9, 1965  R. C. KVAVLE  3,168,744
EXPLOSIVELY-ACTUATED STUD-DRIVING TOOL
Filed Feb. 1, 1963  3 Sheets-Sheet 2
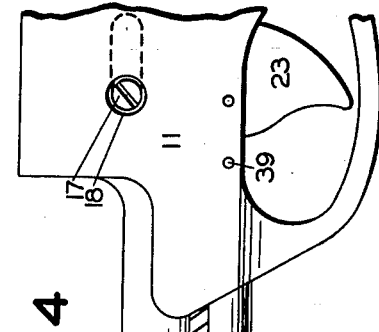
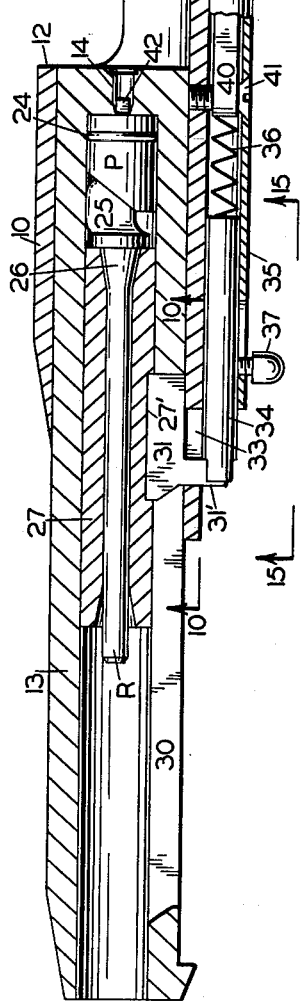
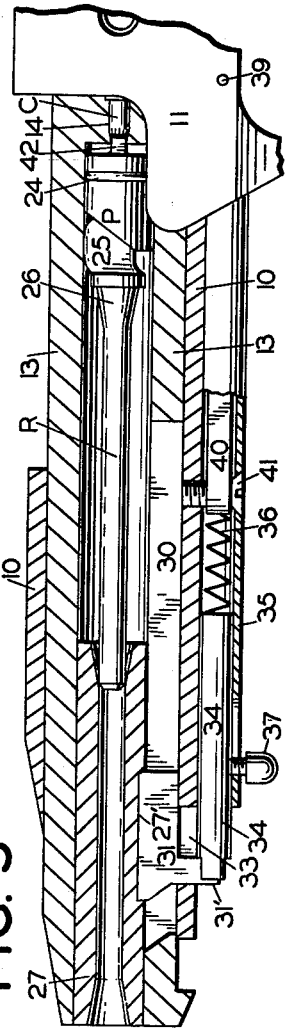
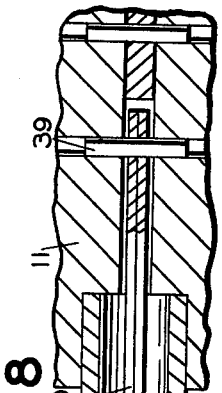
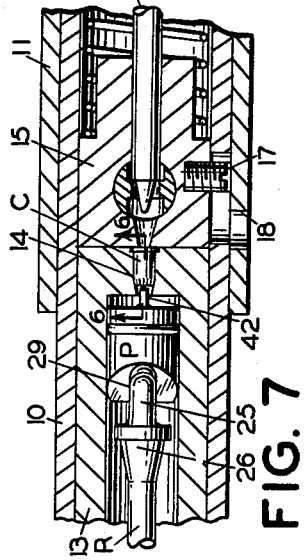
*INVENTOR.*
ROBERT C. KVAVLE
BY
*ATTORNEY*

Feb. 9, 1965
R. C. KVAVLE
3,168,744
EXPLOSIVELY-ACTUATED STUD-DRIVING TOOL
Filed Feb. 1, 1963
3 Sheets-Sheet 3
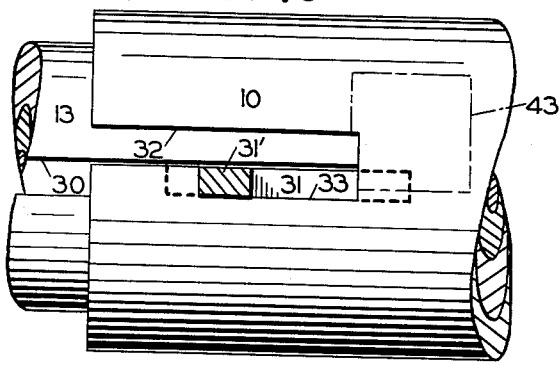
FIG. 10
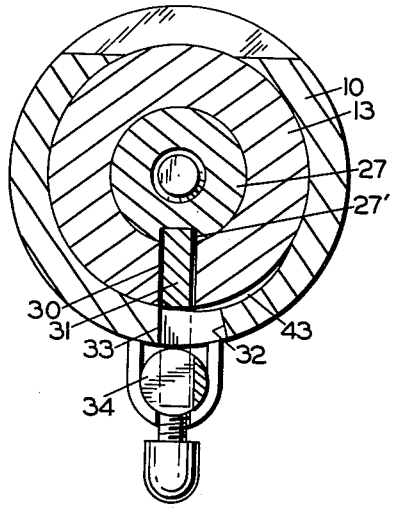
FIG. 12
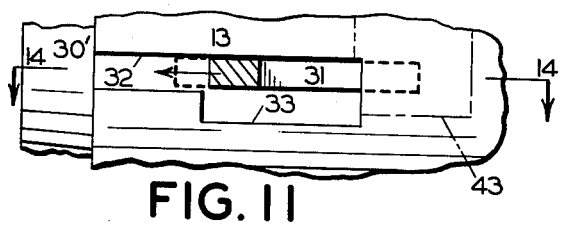
FIG. 11
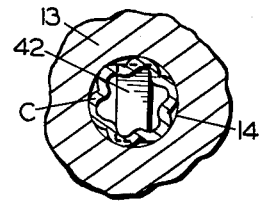
FIG. 6A
FIG. 13
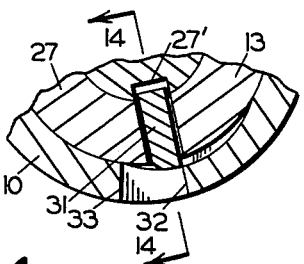
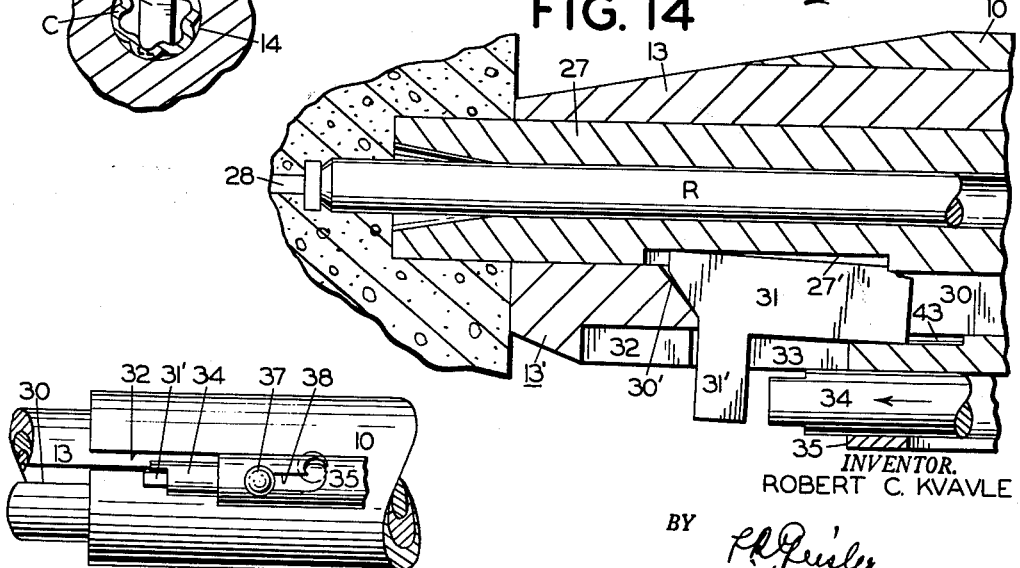
FIG. 14
FIG. 15
INVENTOR.
ROBERT C. KVAVLE
BY
ATTORNEY

United States Patent Office 3,168,744
Patented Feb. 9, 1965

3,168,744
EXPLOSIVELY-ACTUATED STUD-DRIVING TOOL
Robert C. Kvavle, Hillsboro, Oreg., assignor to Omark Industries, Inc., and Ammo Products, Inc., Portland, Oreg., both corporations of Oregon
Filed Feb. 1, 1963, Ser. No. 255,589
8 Claims. (Cl. 1—44.5)

This invention relates to explosively-actuated hand tools, by means of which studs, pins, or similar fastening elements are driven into hard surfaces.

An object of the invention is to provide a pistol-like tool for this purpose of improved and simplified construction, which can be easily assembled, easily and safely operated, and which can easily be dismantled when desired.

Another object of this invention is to provide an improved explosively-actuated tool in which the opening of the tool, in preparation for inserting the new cartridge, will cause the previously fired cartridge to be expelled without any special effort on the part of the operator even though the fired cartridge may have become tight in its aperture in the tool.

A related object is to provide an improved explosively-actuated tool in which the piston, driven by the firing of the cartridge, will be automatially re-positioned in the breech end of the gun barrel by the opening of the tool for the insertion of the cartridge in the tool.

A further object of the invention is to provide such a tool with a novel, specially formed piston and ram assembly which piston and ram will consist of separate elements which will always remain in cooperating relationship while being contained in the gun barrel.

An additional object is to provide a controlling guide for the ram in the gun barrel, which guide will be automatically positioned each time the tool is prepared for firing.

A special object of the invention is to include, in the parts which make up the tool assembly, a novel key which will control the positioning of the guide in the gun barrel.

A further and specific object is to provide a positioning key which will also serve the important purpose of absorbing excess energy when the tool is overdriven, thereby preventing damage to other parts of the tool while also preventing free flight of the ram and piston from the gun barrel, and furthermore a special key which will be expendable and easily removed and replaced.

The manner in which these special objects and other advantages are attained with the tool of the present invention, the form and manner of arrangement of the various parts of this improved tool, and the manner in which the tool is operated, will be briefly described and explained with reference to the accompanying drawings in which:

FIG. 4 is a fragmentary sectional elevation showing the position into which the barrel is manually moved for the loading of the tool, which manual moving of the barrel causes the fired cartridge to be expelled and the piston and ram to be positioned in the barrel in readiness for the next firing of the tool;

FIG. 5 is a corresponding sectional elevation showing the barrel moved back into position in the tool after the new cartridge has been inserted in the tool, preparatory to the cocking of the tool;

Figure 6:
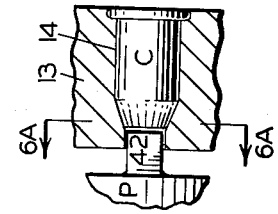
FIG. 6 is a fragmentary sectional elevation taken on line 6—6 of FIG. 7 but drawn to a larger scale.
Figures 1, 2:
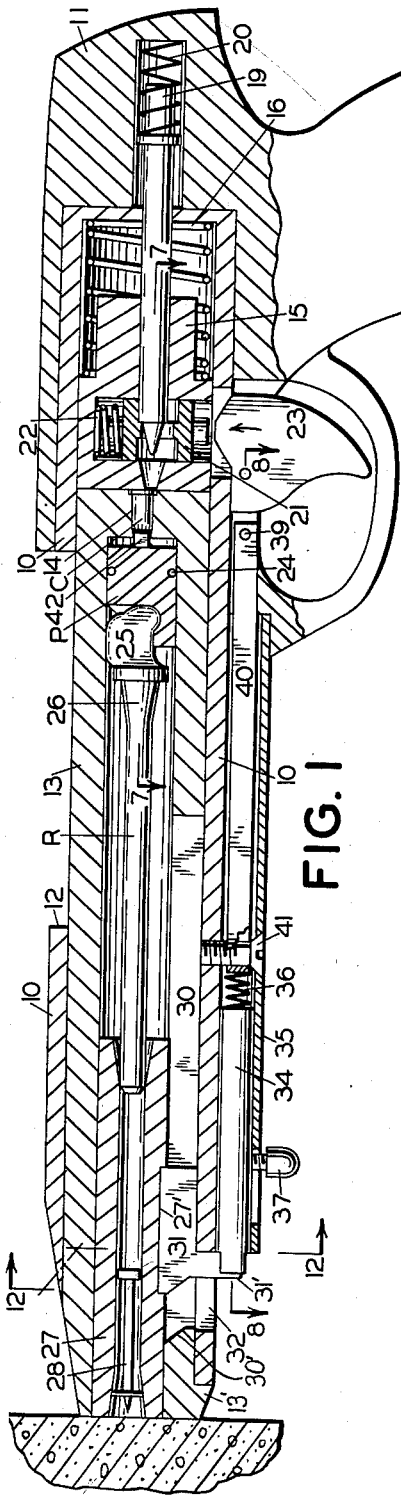
FIG. 1 is a sectional elevation of the tool, taken longitudinally along the approximate center line or axis of the gun barrel, and showing the tool in position ready to be fired.
FIG. 2 is a fragmentary sectional elevation, similar in part to FIG. 1 showing the position of certain elements of the tool immediately after the firing of the tool as the stud is driven into a concrete surface.
Figure 3:
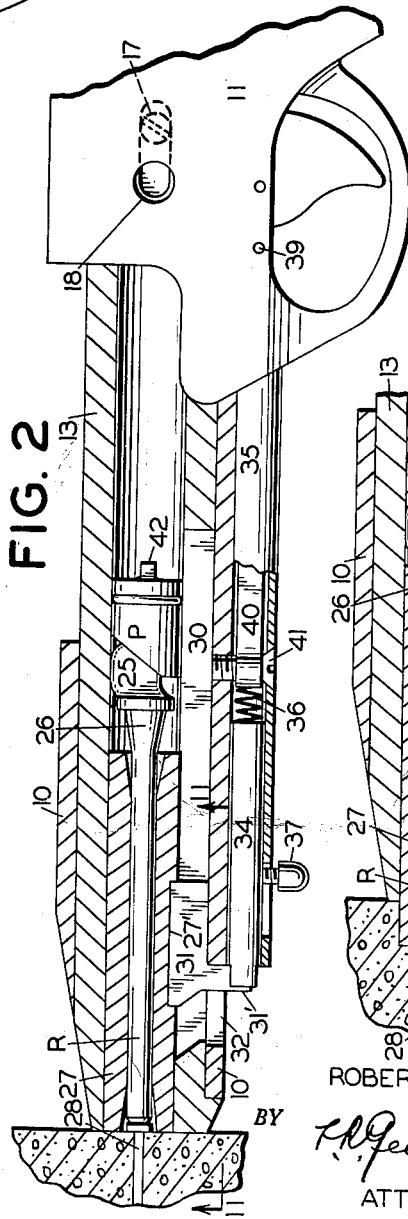
FIG. 3 is a fragmentary sectional elevation, similar in part to FIG. 2, but illustrating the position of certain elements in the tool after firing when the tool has been "over-driven" due to the fact that the surface into which the stud is driven is somewhat softer than that for which the tool is primarily intended to be used.

FIG. 6-A is a fragmentary section on the line indicated at 6A—6A in FIG. 6 but drawn to a still larger scale;

FIG. 7 is a fragmentary section taken on line 7—7 of FIG. 1;

FIG. 8 is a foreshortened section taken on line 8—8 of FIG. 1 but drawn to a larger scale;

FIG. 9 is a perspective view of the piston for the ram taken by itself and drawn to a larger scale, the view being taken from the left side of the piston as viewed in FIGURES 1 to 5 and showing the pocket in the piston for accommodating the specially shaped head of the ram;

FIG. 10 is a fragmentary sectional view taken on line 10—10 of FIG. 4 drawn to an enlarged scale and showing the position of the special key member in the barrel housing during the unloading and loading of the tool, the full length of the key being indicated by broken lines;

FIG. 11 is a fragmentary view similar in part to FIG. 10 but illustrating the course taken by the special key member in an extreme case when the tool has been over-driven;

FIG. 12 is a cross section taken on line 12—12 of FIG. 1 drawn to a larger scale;

FIG. 13 is a fragmentary cross section, corresponding in part to FIG. 12, but illustrating the movement of the special key member when the tool is being over-driven;

FIG. 14 is a fragmentary longitudinal section through the discharging end of the barrel and adjacent portions of the tool taken on the line indicated by 14—14 in FIG. 13, corresponding in part to FIG. 3, but drawn to the larger scale of FIGS. 12 and 13, and also illustrating the action of the special key as a result of the over-driving of the tool; and FIG. 15 is a fragmentary view taken on line 15—15 of FIG. 4.

Referring first to FIG. 1, the tool includes a barrel housing 10, on one end of which is secured the usual handle assembly 11. The housing 10 has an open portion 12 in the top and sides permitting access to the barrel 13. The barrel 13 is longitudinally slidable in the housing 10 to a limited extent, and when pulled to open position in the housing, enables the cartridge to be set in place in the breech end of the barrel for the loading of the tool, and also enables a fired cartridge to be expelled from the barrel of the tool in the manner later explained. The breech end of the barrel is provided with an aperture or chamber 14 to accommodate the cartridge C in the usual manner.

A spring operated controlled firing pin carrier or breech block 15 is slidably mounted within the rear end of the housing 10, as shown in FIG. 1, and is engaged by a spring 16 which is under compression. The carrier 15 has a screw 17 (FIG. 2) extending from one side which engages a slot in the housing wall so as to restrict the movement of the carrier 15 under the force of the spring 16. The screw 17 is accessible through an aperture 18 in the wall of the handle assembly 11.

The firing pin 19, slidably mounted in the carrier 15, is driven by a spring 20 (FIG. 1) mounted in a recess in the handle assembly 11. Prior to the firing of the tool the forward end of the firing pin 19 is engaged by portion of a central shoulder in a sear 21, the sear normally being held in the lowered position shown in FIG. 1 by a spring 22, but, when the sear is thrust upwardly momentarily by a pull on the trigger 23, the sear releases the firing pin. This portion of the device is mostly old and well-known and need not be described further. However a minor feature of this construction is the fact that the sear 21 has both ends symmetrical so that special care is not required in setting the sear in place in the carrier 15.

A piston P is mounted in the gun barrel 13 and adapted to be thrust forward by the firing of the cartridge C. The piston carrits a friction ring 24 on its outer surface which engages the barrel wall so as to prevent inadvertent sliding of the piston in the barrel.

A ram R is removably attached to the piston P. The piston is provided with an open slot 29 (FIG. 9) having a bottom pocket, and the ram R is provided with a specially formed head 25 (FIGS. 1, 2, and 7) which is removably held in the piston slot and pocket. The ram head 25 terminates in a partially spherically shaped detent for engagement with the pocket in the bottom of the piston slot, the pocket and the detent being correspondingly shaped. A portion of the ram head opposite the detent contacts the gun barrel when the ram head is in the piston slot and prevents disengagement of the head from the piston pocket and slot as long as the ram head is confined within the gun barrel. Thus both the piston and ram are contained and fitted in the bore of the barrel in such manner that they are held in interlocked relation while in the barrel, but are easily disconnected when the piston is permitted to project partially from the barrel muzzle. The special cooperating elements by which the ram and piston are connected, namely the specially shaped head of the ram and the correspondingly shaped pocket for this head in the piston, are so designed that maximum width is obtained for the head of the ram while the thrust on the ram head is centered by center contact on the head and thus exerted axially through the ram. The head of the ram is of greater thickness than the width of the barrel slot 30, referred to later.

A guide 27 for the shank of the ram R is slidably positioned in the barrel 13. This guide 27 has a bore reduced in diameter through which the shank of the ram is slidable. The bore of the guide also holds the stud 28 (FIG. 1) in place in the tool preparatory to the driving of the stud by firing of the tool. As apparent from FIGS. 1 and 2, the firing of the tool causes the shank of the ram to be thrust against the head of the stud 28 and to drive the stud into the surface against which the muzzle of the barrel is pushed. The inner end of the ram shank has an increased diameter portion 26 and collar where the shank joins the specially shaped head 25 of the ram. The inner end of the bore of the guide 27 is increased in diameter to accommodate in part the increased diameter end 26 of the shank of the ram while forming a stop for the head of the ram. Preferably the guide 27 is formed with both ends identically enlarged so that in assembling and reassembling the tool the guide 27 may be placed in the tool without regard to which end is innermost in the barrel.

The piston P is made of metal of greater heat-treated hardness than the head and shank portion of the ram. In the event the tool is over-driven the softer metal of the ram will absorb some of the energy expended. The tip of the ram shank is given a higher heat-treated hardness than the remainder of the shank and head of the ram. The ram itself is expendable when necessary. The special half ball and socket joint connection between the piston and ram is designed particularly to prevent any damage to the piston or any spreading of the piston as a result of its forcible engagement with the ram, and this is one of the features of the tool.

The barrel 13 is longitudinally slidable in the housing 10. The bottom of the barrel has a longitudinally extending slot 30 closed at each end, in which a specially shaped key 31 is carried. Preferably the end wall 30' of the front end of the slot 30 is inclined upwardly, as shown in FIG. 1, and the forward edge of the key is correspondingly shaped. The key 31 has a downwardly extending finger 31'. The forward end of the bottom of the housing has a slot 32 which, as shown best in FIG. 10, extends to the outer end of the housing. This slot has a cut-out portion 33 in one side located inwardly from the end of the slot 32 which cutout portion is adapted to engage the finger 31' of the key when the barrel 13 is rotated slightly (clockwise as viewed from the left in FIG. 10 and as viewed in FIG. 12) to bring the barrel into normal position with respect to the housing.

In order to hold the extending finger 31' of the key 31 in this cut-out portion 33 in the side of the housing slot 32, and to hold the barrel against inadvertent slight rotation with respect to the housing under normal conditions, while allowing the barrel longitudinal sliding movement to a limited extent with respect to the housing, a spring actuated plunger 34 is slidably mounted in a guideway 35 which guideway is secured on the bottom of the housing 10. The spring 36 for this plunger normally holds the plunger in engagement with the finger 31' of the key 31, the outer end of the plunger being shaped as shown in FIG. 15 and thus having an extension on the side towards the housing slot 32 to extend over one face of the finger 31'. Under normal operating conditions this engagement of the finger 31' by the plunger 34 holds the key 31 in substantially fixed rotational position. The plunger 34 carries a finger knob 37 which moves in a restricting L-shaped slot 38 (FIGS. 3 and 15) which enables the plunger to be held in withdrawn, inoperative position when desired.

The outer wall of the guide 27 is provided with a centrally located recess 27' to receive the inner edge portion of the key 31. Consequently the key 31 also controls the movement of the guide 27 in the barrel and in the tool. This is an additional feature of the invention which will be referred to later in this description.

The handle assembly 11 is firmly but removably held on the inner end portion of the housing 10 by a transverse pin 39 (FIGS. 1 and 8) in the handle assembly which is secured to a holding bar 40. The opposite or forward end of this holding bar is formed with an eye loop which is secured in place by a screw 41 mounted in the bottom of the housing 10.

The inside rear wall of the piston P has a centrally positioned rectangularly shaped tongue 42 which is of proper size and shape to enter the forward end portion of the cartridge aperture 14 in the breech of the barrel. The purpose of this extending tongue is to engage the outer end of a fired cartridge to cause the fired cartridge to be expelled in the event the cartridge should be wedged tightly in the aperture 14. Ordinarily, as mentioned later, the fired cartridge will be expelled by pneumatic pressure, but in extreme cases in which pneumatic pressure is not sufficient to expel the fired cartridge the engagement of the end of the cartridge by the tongue 42 will do so. It will be noted from FIG. 6 and FIG. 6–A that the width of the tongue exceeds slightly the diameter of the discharging end of the cartridge, the end of the cartridge aperture being made of proper size to accommodate the tongue 42. It will also be evident that this means for expelling the cartridge can be adapted to cartridges whether or not the ends of the shells are crimped as illustrated in the figures. This special provision for expelling the fired cartridge is another feature of the tool.

When the tool is to be loaded the barrel 13 is manually pulled outwardly in the housing 10 to the extent permitted by the key 31 when the finger 31' of the key is in normal position in the cut-out portion 33 of the housing slot 32 and thus the barrel is pulled outwardly to the position illustrated in FIG. 4, whereupon the cartridge is set in place in the cartridge aperture 14. The locked key 31, which passes through the slot 30 in the barrel 13, permits the barrel to be pulled outwardly to the extent shown in FIG. 4. However, since the guide 27 is held by the key 31, the moving of the barrel outwardly will cause the guide 27 to be positioned inwardly in the barrel. The guide, which in turn engages the inner end of the ram R, will cause the ram and piston also to be positioned at the inner end of the barrel. Then the barrel is manually moved inwardly in the housing to the position shown in FIG. 5. Since the key 31 is held against movement and its engagement at all times with the guide 27, this inward movement of the barrel causes the guide 27 to be positioned at the muzzle end of the barrel. However the piston P, and therewith the ram R, will not change their relative position in the barrel with the inward movement of the barrel due to the friction ring 24 on the piston. When the stud or fastening element is placed in the bore of the guide 27 the tool is then ready to be cocked.

In order to cock the tool it is now necessary to press the muzzle of the barrel against the surface into which the stud 28 is to be driven, as illustrated in FIG. 1, thrusting the housing and handle assembly to the left (as viewed in FIG. 1) as far as possible until an outer flange 13' (FIG. 1) on the barrel engages the outer end of the housing. This causes the firing pin carrier 15 to be moved inwardly against the force of the spring 16 and causes the sear 21 and firing pin 19 also to be moved until these elements are in the cocked position shown in FIG. 1. This thrusting of the barrel and guide 27 inwardly with respect to the housing will also cause the key 31 and the plunger 34 to be moved in the same direction against the force of the plunger spring 36. Since this inward movement of the barrel in the housing brings the sear in firing position with respect to the trigger 23 (FIG. 1) a pull on the trigger causes the sear to move upwardly and free the firing pin. As apparent, it is impossible to fire the tool unless the barrel is thrust inwardly relatively with respect to the housing to the fullest extent against spring pressure.

The firing of the tool under normal conditions brings the piston and ram into the position illustrated in FIG. 2, the inpingement of the ram against the stud 28 causing the stud to be driven into place in the surface against which the muzzle has been placed. For recharging the tool the barrel 13 is again pulled outwardly in the housing 10. This causes the piston again to be moved relatively towards the breech end of the barrel as previously mentioned and as shown in FIG. 4. This relative movement of the piston inwardly in the barrel results in the included air and gases in the barrel between the breech end of the barrel and the piston becoming compressed, and, under most circumstances this will exert sufficient pressure to expel the fired cartridge from the breech of the barrel. However, if the fired cartridge is not expelled by this air and gas pressure, the further movement of the piston inwardly relatively with respect to the barrel will result in the tongue 42 entering into the forward end of the cartridge aperture and engaging the cartridge shell as previously mentioned.

If it is desired to remove the barrel 13 entirely from the housing 10 and to remove the guide 27 and ram and piston from the barrel this is easily accomplished by removing the key 31. The plunger 34 is first moved back manually by means of the finger knob 37 and is held in withdrawn position by engaging the finger knob 37 in the notch at the rear of the slot 38. Then the barrel is rotated slightly (counterclockwise as viewed from the left of FIGS. 10 and 15) with respect to the housing 10 to bring the key into the open slot 32 of the housing. Whereupon the key will drop out of the tool.

In the event the surface into which the stud 28 is driven should be soft enough to cause the tool to be over-driven, the increased impact of the end portion 26 of the ram with the guide 27, with the rebound of the tool, will produce a shearing strain on the key 31. In extreme cases this could produce actual shearing or mutilation of the key 31, but this would occur without damage to any other members or parts of the tool. In this improved tool the key 31 serves as an expendable member and its main feature is to facilitate the absorption of the excess energy in the event of such overdrive, at the expense of mutilation of the key under extreme circumstances, and acting as a protection against resulting damage to other parts of the tool.

FIGS. 3, 11, 12, 13 and 14 illustrate the manner in which the key 31 and associated parts of the device function when the tool is subjected to an extreme over-drive, such as would occur when the material into which the stud is being driven is considerably softer that than on which the tool would normally be used. The sudden thrust given to the guide 27 by the head of the ram under such conditions would cause the guide 27 to be moved relatively forwardly with respect to the barrel 13 and housing 10 and would bring the key 31 against the front wall 30' of the slot 30 in the barrel 13 as shown best in FIG. 14. This would occur so quickly that the finger 31' of the key 31 would move ahead of the plunger 34 momentarily before the plunger has time to move sufficiently to keep in touch with the finger 31'. The inside wall of the housing 10 is relieved along the side of the slot 32 and opposite the cut-out portion 33, as shown at 43 in FIGS. 12 and 14. If the impact received by the key 31 as the key is thrust against the end wall 30' of the slot 30 is severe enough, the key, being forced down against the relieved portion 43 of the inside wall of the housing, will move laterally slightly in the direction in which the wall is relieved. This will produce a slight rotation of the barrel 13 with respect to the housing and bring the key 31 into the open slot 32 of the housing, whereupon the key will drop from the tool. This course followed by the key under such condition is illustrated in FIGS. 10 and 11 and in FIGS. 12 and 13.

The result is this deforming of the key absorbs the shock imposed on the tool by the severe over-drive and prevents damage to the other parts of the tool which otherwise might occur. The key is purposely made of softer metal than the barrel 13 and guide 27 and is relatively inexpensive and purposely expendable.

Thus the improved tool of this invention, through the medium of the novel key and the novel construction and arrangement of various parts, is easily assembled and disassembled, is easily and safely operated, and is adequately protected against excessive "over-drive."

As previously mentioned, it is necessary in order to fire the tool to press the barrel muzzle against the surface, into which the stud is to be driven, so as to cause the barrel to be thrust inwardly in the housing against spring pressure before pulling the trigger. Consequently any inadvertent firing of the tool is impossible. Furthermore inadvertent dropping of the loaded tool, causing the butt end, or rear end of the handle portion, to strike the ground forcibly could not result in the firing of the tool. While such impact on the butt end of the tool would momentarily cause inward movement of the barrel in the housing such inward movement would be limited by engagement of the flange 13' (FIG. 1) on the end of the barrel 13 with the end of the housing 10. The same impact, however, would also cause the firing pin carrier or breech block 15 to be moved in the same direction in the housing against the force of the spring 16, thus momentarily providing a spacing between the breech end of the barrel and the carrier 15.

I claim:

1. In a device of the character described for explosively-driving a stud or the like, a gun barrel, a piston and a ram slidably mounted in said barrel, said ram having a shank portion for impingement against the stud being driven and an inner specially formed head terminating in a partially spherically shaped detent, said piston having an open slot with a bottom pocket corresponding to said detent for removably receiving said ram head, a portion of said ram head opposite said detent engaging said gun barrel and holding said detent in said piston slot pocket, whereby said ram head and said piston remain interlocked as long as they are contained within said barrel, said shank of said ram being of less hardness than said head portion and said piston, said ram head and said piston slot so shaped that thrust on said head by said piston will be exerted axially through said ram, and a guide in said barrel for said shank of said ram, said guide having a bore of reduced diameter for slidably receiving said shank of said ram.

2. In a device of the character described for explosively-driving a stud or the like, a housing, a gun barrel slidable and rotatable in said housing, said housing having an open portion permitting access to the breech end of said barrel when said barrel is moved forwardly in said housing, a cartridge-holding aperture in the breech end of said barrel, said barrel having a longitudinally-extending slot closed at both ends, said housing having a longitudinally-extending slot open at the forward end, a piston and a ram slidably mounted in said barrel, said ram having a shank portion for impingement against the stud being driven and an inner head portion, a guide in said barrel for said shank of said ram, said guide having a bore of reduced diameter for slidably receiving said shank of said ram, said guide being slidable in said barrel, a member connected with said guide and slidable in said barrel slot and in said housing slot, a notch in said housing slot for engaging said member, and means on said housing for releasably holding said member in said notch, whereby when said barrel is moved forwardly in said housing said member and said guide will be held against movement by said notch and said means and thereby cause said ram and said piston to be moved relatively with respect to said barrel to their rear active position in said barrel, and whereby said guide and said member, when said member is held against movement by said notch and said means, will limit the forward movement of said barrel in said housing.

3. In a device of the character described for explosively-driving a stud or the like, a housing, a gun barrel slidable and rotatable in said housing, said housing having an open portion permitting access to the breech end of said barrel when said barrel is moved forwardly in said housing, a cartridge-holding aperture in the breech end of said barrel, said barrel having a longitudinally-extending slot closed at both ends, said housing having a longitudinally-extending slot open at the forward end, a piston and a ram slidably mounted in said barrel, said ram having a shank portion for impingement against the stud being driven and an inner specially formed head terminating in a partially spherically shaped detent, said piston having an open slot with a bottom pocket corresponding to said detent for removably receiving said ram head, a portion of said ram head opposite said detent engaging said gun barrel and holding said detent in said piston slot pocket, whereby said ram head and said piston remain interlocked while contained within said barrel, a guide in said barrel for said shank of said ram, said guide having a bore of reduced diameter for slidably receiving said shank of said ram and for acting as a stop for said head portion of said ram, said guide being slidable in said barrel, a key connected with said guide and slidable in said barrel slot and in said housing slot, a notch in said housing slot for engaging said key, and means on said housing for holding said key in said slot.

4. In a device of the character described, a housing, a gun barrel slidable and rotatable in said housing, said housing having an open portion permitting access to the breech end of said barrel when said barrel is moved forwardly in said housing, a cartridge-holding aperture in the breech end of said barrel, said barrel having a longitudinally-extending slot closed at both ends, a piston and connected ram slidably mounted in said barrel, a guide in said barrel for said ram, said guide being slidable in said barrel, a key slidable in said barrel slot, a recess in the outer wall of said guide, said key fitting said recess and thereby preventing movement of said guide without corresponding movement of said key as long as said key is in said recess, the forward end of said housing having an open ended slot for said key, a downwardly extending finger on said key, said housing slot having a notch for temporarily engaging said key finger, means on said housing for removably holding said key finger in said notch, whereby when said barrel is moved forwardly in said housing said guide will be held against movement as long as said finger remains in said notch and thereby cause said ram and said piston to be moved relatively with respect to said barrel to their rear active position in said barrel, and whereby the movement of said piston relatively with respect to said barrel to the breech end of said barrel will cause compression of the contained air in said breech end of said barrel to exert an expelling pressure on the fired cartridge in said breech end.

5. The combination set forth in claim 4 with the addition of a friction ring on said piston engaging the bore in said barrel to prevent inadvertent forward moving of said piston and connected ram in said barrel when said barrel is moved back to normal position in said housing.

6. In a device of the character described, a housing, a gun barrel slidable and rotatable in said housing, said housing having an open portion permitting access to the breech end of said barrel when said barrel is moved forwardly in said housing, a cartridge-holding aperture in the breech end of said barrel, said barrel having a longitudinally-extending slot closed at both ends, a piston and a ram slidably mounted in said barrel, said ram having a shank portion for impingement against the element being driven by the tool and having an inner head portion, said head portion of said ram and said piston having cooperating engaging elements causing said ram to be connected to said piston while contained within said barrel, a guide in said barrel for said shank of said ram, said guide having a bore of reduced diameter for slidably receiving said shank of said ram but adapted to act as a stop for said head portion of said ram, a key slidable in said barrel slot, the outer wall of said guide having a centrally positioned recess, said key fitting said recess and preventing movement of said guide without corresponding movement of said key as long as said key is held in said recess, the forward end of said housing having an open ended slot for said key, said key having a downwardly extending finger, a cut-out portion in one side of said latter mentioned housing slot for receiving said key finger, a spring-actuated member mounted on the outside of said housing engageable with said key finger for temporarily holding said key finger in said cut-out portion of said housing slot to prevent longitudinal movement of said key finger and key in said housing, whereby when said barrel is moved forwardly in said housing said guide will be held against said movement and thereby cause said ram and said piston to be moved relatively with respect to said barrel to their rear active position with said piston in contact with the breech wall in said barrel, and whereby the movement of said piston relatively with respect to said barrel to the breech end of said barrel will cause the compression of the contained air in said breech end to exert an expelling pressure on the fired cartridge at breech end, and a friction ring on said piston engaging the bore in said barrel to prevent inadvertent forward movement of said piston and ram in said barrel when said barrel is moved back to normal position in said housing.

7. The combination set forth in claim 6 with the addition of a rearwardly protruding tongue centrally positioned on the rear wall of said piston in axial alignment with said cartridge-holding aperture and of the proper size to enter said aperture for said cartridge when said piston contacts the breech wall of said barrel, whereby to exert an expelling thrust against a fired cartridge if the cartridge has not been expelled by the contained air compressed by said piston.

8. The combination set forth in claim 6 with the inside surface of said housing having a relieved portion adjacent said housing slot and opposite said cut-out portion of said housing slot to facilitate the distorting of said key when said guide and key are subjected to heavy impact with the over-driving of the device, whereby the distorting of said key enables said guide to be forced forwardly further with respect to said housing and the distorting of said key and additional forward movement of said guide relatively with respect to said housing will serve to cushion the effect of the excessive over-drive of the device.

References Cited by the Examiner
UNITED STATES PATENTS

| | | | |
|---|---|---|---|
| 2,724,116 | 11/55 | Termet | 1—44.5 |
| 2,930,042 | 3/60 | Temple | 1—44.5 |
| 3,044,071 | 7/62 | Behrend | 1—44.5 |
| 3,060,436 | 10/62 | De Caro et al. | 1—44.5 |

GRANVILLE Y. CUSTER, JR., *Primary Examiner.*